Oct. 11, 1927.
G. B. LINDERMAN, JR
1,644,684
SPECIFIC GRAVITY DETERMINING APPARATUS
Filed May 27, 1924
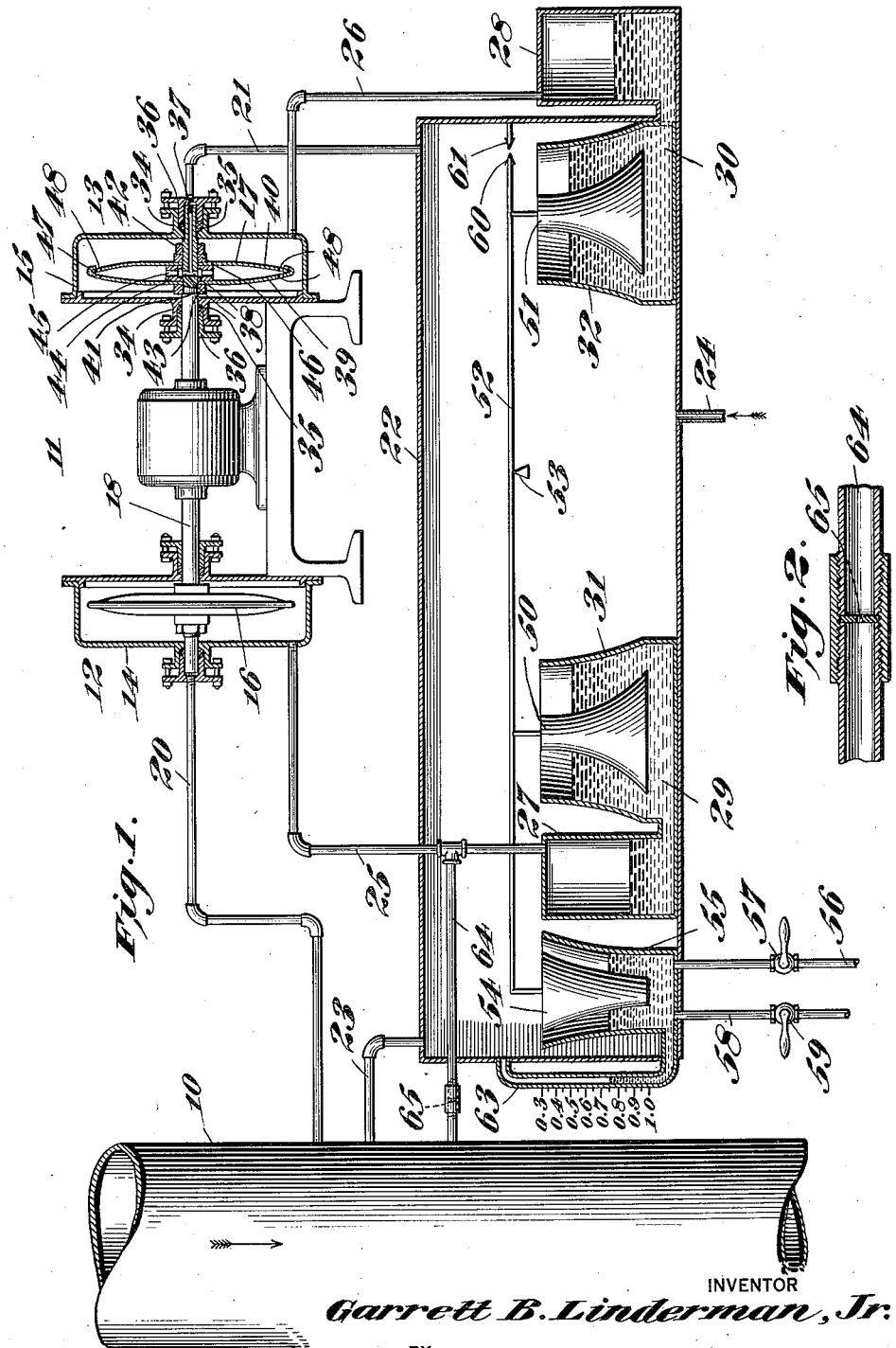
INVENTOR
*Garrett B. Linderman, Jr.*
BY
*A. B. Reavis*
ATTORNEY Patented Oct. 11, 1927.

1,644,684

UNITED STATES PATENT OFFICE.

GARRETT B. LINDERMAN, JR., OF BETHLEHEM, PENNSYLVANIA, ASSIGNOR, BY MESNE ASSIGNMENTS, TO AMERICAN METER COMPANY, OF NEW YORK, N. Y., A CORPORATION OF DELAWARE.

SPECIFIC-GRAVITY-DETERMINING APPARATUS.

Application filed May 27, 1924. Serial No. 716,223.

My invention relates to apparatus for determining the specific gravity of fluids, and it has for an object to provide a device of this character which shall operate dynamically upon a fluid whose specific gravity is to be determined and upon a fluid of reference in order to develop pressures whose difference is utilized to determine the ratio of the densities of the fluids.

More particularly, my invention has for an object to provide apparatus of the character referred to, which incorporates a pair of blowers, one blower being supplied with air, and the other blower being supplied with gas, the supply of air and of gas being under equal pressures, together with means associated with the outlet connections of the blowers for determining the specific gravity of the gas with respect to the air.

A further object of my invention is to provide a pair of blowers whose rotors are operated in a predetermined speed relation, and which are supplied with gas and air respectively at equal pressures, together with manometric devices associated with the outlet connections of the blowers, the manometric devices each having a leg exposed to the same pressure, and the latter legs containing logarithmic floats, whereby the ratio of the mass per unit volume of gas with respect to the mass per unit volume of air may be ascertained.

Apparatus made in accordance with my invention is illustrated in the accompanying drawings, forming a part of this application, in which:

Figure 1 is a diagrammatic view of my improved specific gravity determining apparatus, and Figure 2, a longitudinal section of a portion of the apparatus illustrating circulation orifice means.

Referring now to the drawing more in detail for a better understanding of my invention, I show a gas main 10 having associated therewith specific gravity determining apparatus, at 11, which determines the specific gravity of the gas flowing through the main 10 with respect to air.

The specific gravity determining apparatus, at 11, includes a gas blower 12 and an air blower 13 having casings 14 and 15 and rotors 16 and 17, respectively, the rotors 16 and 17 being driven in predetermined speed relation, preferably synchronously, for example, I show the rotors 16 and 17 carried by the same rotor shaft 18.

The gas blower 12 is provided with an inlet connection 20 which communicates centrally with respect to the casing 14 and with the gas main 10. The casing 15 of the air blower 13 is provided with an air inlet connection 21. In order that air supplied to the air blower 13 shall be under the same pressure as gas supplied to the gas blower 12, I provide pressure equalizing means between the supply connections 20 and 21. To this end, the air supply connection 21, preferably communicates with a chamber 22 which is provided with a connection 23 leading to the gas main 10. Air is supplied to the chamber 22 through a small inlet connection 24, such connection being associated with any suitable means for securing a small flow of air into the chamber 22, the object being merely to supply sufficient air into the chamber 22 to prevent the flow of gas therein through the connection 23. The inflow of air is so controlled that the pressure of air in the chamber 22 will be equal to that of the gas in the main 10.

The gas blower 12 and the air blower 13 are provided, respectively, with outlet connections 25 and 26 communicating with the leg portions 27 and 28 of the manometric devices 29 and 30, respectively. The manometric devices 29 and 30 are partially filled with any suitable fluid and the legs 31 and 30 thereof are preferably in open communication with the chamber 22 so that the fluid of the manometric devices shall be subjected to the pressure of gas developed by the blower 12 and the air developed by the blower 13, and to the pressure existing in the chamber 22.

The rotors 16 and 17 are identical in construction and it is necessary to describe only one specifically Referring to the air blower 13, it will be noted that the casing 15 is provided with bearings 34 having packing 35 held in place by caps 36. The outside cap 36 is connected to the air supply conduit 21 aligned with the outer end of the shaft 18, the latter having an axial passage 37 communicating with radial passages 38. The rotor 17 is preferably made of dished members 39 and 40 held in place on the shaft 18 by means of a shoulder 41 provided on the shaft and by a nut 42 threaded to the shaft, the dished member 39 being spaced from the shoulder 41 by a spacing member 43, the dished members 39 and 40 being spaced by a spacing member 44 having passages 45 therein which afford communication between the passages 38 and the space between the dished members, and a spacing member 46 being arranged between the nut 42 and the dished member 40. The dished members are joined at their peripheries in any suitable manner, as indicated at 47, and adjacent to the joint air outlet openings 48 are provided. In operation, air enters the rotor 17 from the supply connection 21; and, due to centrifugal force, such air is discharged from the openings 48, thereby building up air pressure in the casing 15 which depends both upon the speed and the density of air. The rotor 16 is identical in structure and acts on gas in the same way.

Since the pressures developed in the gas and air blowers are, respectively, functions of the angular velocity and density, if the rotors have the same angular velocity, the factor of angular velocity cancels out of the equation for specific gravity, $$S = \frac{f(wDg)}{f(wDa)} = \frac{Dg}{Da}$$

in which S=specific gravity of the gas, $f=$ angular velocity, $w=$weight, $Dg=$density of gas, $Da=$density of air. Therefore, the pressure developed by the gas blower divided by the pressure developed by the air blower is a measure of the specific gravity. Since, the rotors are operated with a predetermined or fixed relation of angular velocities, it will be apparent that the rotors might be of different diameters, operate at different angular velocities, or both, so long as the relation is fixed and known; however, I prefer, from the standpoint of simplicity, to have the ratio of the angular velocities equal to unity.

Since specific gravity of a gas is the quotient of the density of gas divided by the density of air, in order to readily and automatically effect acts of division for this purpose, as more fully disclosed in my application, Serial No. 657,344, filed Aug. 14, 1923, I preferably use logarithmic floats 50 and 51 in connection with the fluid in the legs 31 and 32, the design of each float being such that the buoyant force thereof is proportional to the logarithm of the liquid level. The floats 50 and 51 are preferably carried by a beam 52 fulcrumed at 53. Considering counterclockwise moments as positive, and clockwise moments as negative, it will be apparent that the logarithm of the specific gravity of the gas is equal to the moment of the logarithm of the liquid level in leg 31 minus the moment of the logarithm of the liquid level in leg 32. In order to readily determine the value of the density of the gas divided by the density of air, I preferably associate in connection with the beam 52, a third float 54 connected to the beam and arranged within a receptacle 55. The float 54 is designed oppositely in principle to the floats 50 and 51; in other words, the zero or datum position would fall above the top of the float, so that any increase in the liquid level in the receptacle 55 corresponds to the decrease in the logarithm of the liquid level. Any suitable liquid may be supplied to the receptacle 55 by a conduit 56 having a valve 57 therein, and liquid may be withdrawn from the receptacle 55 by a conduit 58 having a valve 59.

In operation, the blowers will develop different pressures of air and gas, since the masses of each are different per unit volume, the pressures of gas and air, respectively, resulting in levels of liquid in the legs 31 and 32 which are proportional to the respective pressures, or proportional to the densities of the respective media. Since the floats 50 and 51 are so designed that each exerts a buoyant force proportional to the logarithm of the liquid level, it will be apparent that the moments developed about the fulcrum 53 will be equal to the logarithm of the liquid level in the leg 31 times the distance of the support connection of the float 34 from the fulcrum 53. In like manner, a moment will be supplied to the beam 52 corresponding to the logarithm of the liquid level in the leg 32 times the distance of the support of the float 51 from the fulcrum 53. If, in operation, the equilibrium position of the beam 52 is disturbed, owing to a change in the specific gravity of the gas, such beam will move, displacing the pointer 60, carried by the lever, with respect to the stationary pointer or indicator 61, the pointers 60 and 61 being opposite to each other when the beam 52 is in normal position. With a disturbance of the normal position of the beam 52, owing to a change in the specific gravity of the gas, the operator admits or withdraws fluid to or from the receptacle 55 in order that a moment may be applied to the beam for bringing the latter back to normal position with the pointers 60 and 61 in registry. Since the float 54 is of the logarithmic type, but oppositely designed when compared with the floats 50 and 51, it will be apparent that, in equilibrium position of the beam 52, the moment of the buoyant effect of the float 54 is equal to the moment of the buoyant effect of the float 50 minus that of the float 51.

The receptacle 55 has a gauge glass 63 communicating at the bottom thereof, the upper end of the gauge glass being in communication with the chamber 22 so that equality of the pressures is assured on the surface of liquid in the glass 63 and on the surface of liquid in the receptacle 55. The liquid level of the fluid in the gauge glass 63 represents the anti-logarithm of the logarithm of the difference of the logarithms of the liquid levels in the legs 31 and 32, respectively, which anti-logarithm corresponds to the specific gravity of the gas.

In order that the sample of gas in the blower casing 14 shall be changed, I show a conduit 64 which communicates with the outlet connection 25 and with the main 10, the conduit containing a small orifice 65, so that a small flow or circulation of gas is assured with the result that a stagnant accumulation in the gas blower is avoided.

While I have shown my invention in but one form, it will be obvious to those skilled in the art that it is not so limited, but is susceptible of various other modifications without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. In apparatus for determining specific gravity of a gas, first and second pressure-developing centrifugal devices, means for operating said devices in a predetermined speed relation, means for supplying air to the first device, means for supplying gas to the second device, means for maintaining an equilibrium of pressures of the air and gas supplied to the respective devices, outlet connections for the devices, manometers having legs connected to the respective outlet connections of the devices and having their other legs subjected to the pressure of the supplied air and gas, floats in said other legs, and means operated by said floats for ascertaining the specific gravity of the gas in terms of air.

2. In gas specific gravity determining apparatus, the combination of a gas main, a blower connected to the gas main, a manometer connected to the outlet of the blower, and means for securing limited circulation of gas from the main through the blower and back to the main, an air blower, a manometer connected to the outlet thereof, and means responsive to the level difference in said manometers for disclosing the specific gravity of gas in terms of air.

3. In specific gravity determining apparatus, the combination of a pair of blowers, means for supplying gas to one blower, means for supplying air to the other blower, outlet connections for the blowers, manometers associated with the respective outlet connections, logarithmic floats in the manometers, and a balance beam for connecting the floats, a receptacle, a logarithmic float in the receptacle, means for supplying or withdrawing fluid to or from the receptacle, and indicating means for showing the liquid level in said receptacle.

In testimony whereof I hereunto affix my signature this 22nd day of May, 1924.

GARRETT B. LINDERMAN, Jr.